United States Patent [19]

Heikinheimo

[11] 4,185,733
[45] Jan. 29, 1980

[54] TRANSFERRING AND ASSORTING APPARATUS FOR SAWN TIMBER

[75] Inventor: Lennart O. Heikinheimo, Helsinki, Finland

[73] Assignee: Plan-Sell Oy, Helsinki, Finland

[21] Appl. No.: 846,346

[22] Filed: Oct. 28, 1977

[30] Foreign Application Priority Data

Nov. 26, 1976 [FI] Finland .............................. 763418

[51] Int. Cl.$^2$ ........................................... B65G 47/34
[52] U.S. Cl. .................................. 198/477; 198/483; 198/680; 198/796; 209/912
[58] Field of Search .............. 198/365, 370, 477, 482, 198/483, 680, 796, 802; 214/1 BA, 6 DK, 6 FA; 414/77; 209/517-520, 912

[56] References Cited

U.S. PATENT DOCUMENTS

| 2,007,044 | 7/1935 | Francis ............................... 198/796 |
| 3,388,784 | 6/1968 | Gartner ....................... 214/6 DK X |

FOREIGN PATENT DOCUMENTS

302923  8/1968  Sweden ................................. 198/477

*Primary Examiner*—James L. Rowland
*Attorney, Agent, or Firm*—Cushman, Darby & Cushman

[57] ABSTRACT

A transferring and assorting apparatus for sawn timber, having been fitted to grip one piece of timber at a time from a feed conveyor and to transfer and deliver it to a certain point and having, at even intervals in the longitudinal direction of an endless conveyor, a minimum of two substantially L-shaped support hooks at a distance from each other in the transverse direction, each hook comprising an arm which protrudes from the endless conveyor and has at its outer end a support parallel to the conveyor, the support having been fitted to be pushed under the piece of timber on the feed conveyor and to support and transfer it to the delivery point, where the support hooks have been fitted to turn about a transverse axle to drop the piece of timber, the pivot axle of the support hook being fitted at such a point that the distance between the support hooks does not substantially decrease when the support hook is turned for tipping the piece of timber.

3 Claims, 1 Drawing Figure

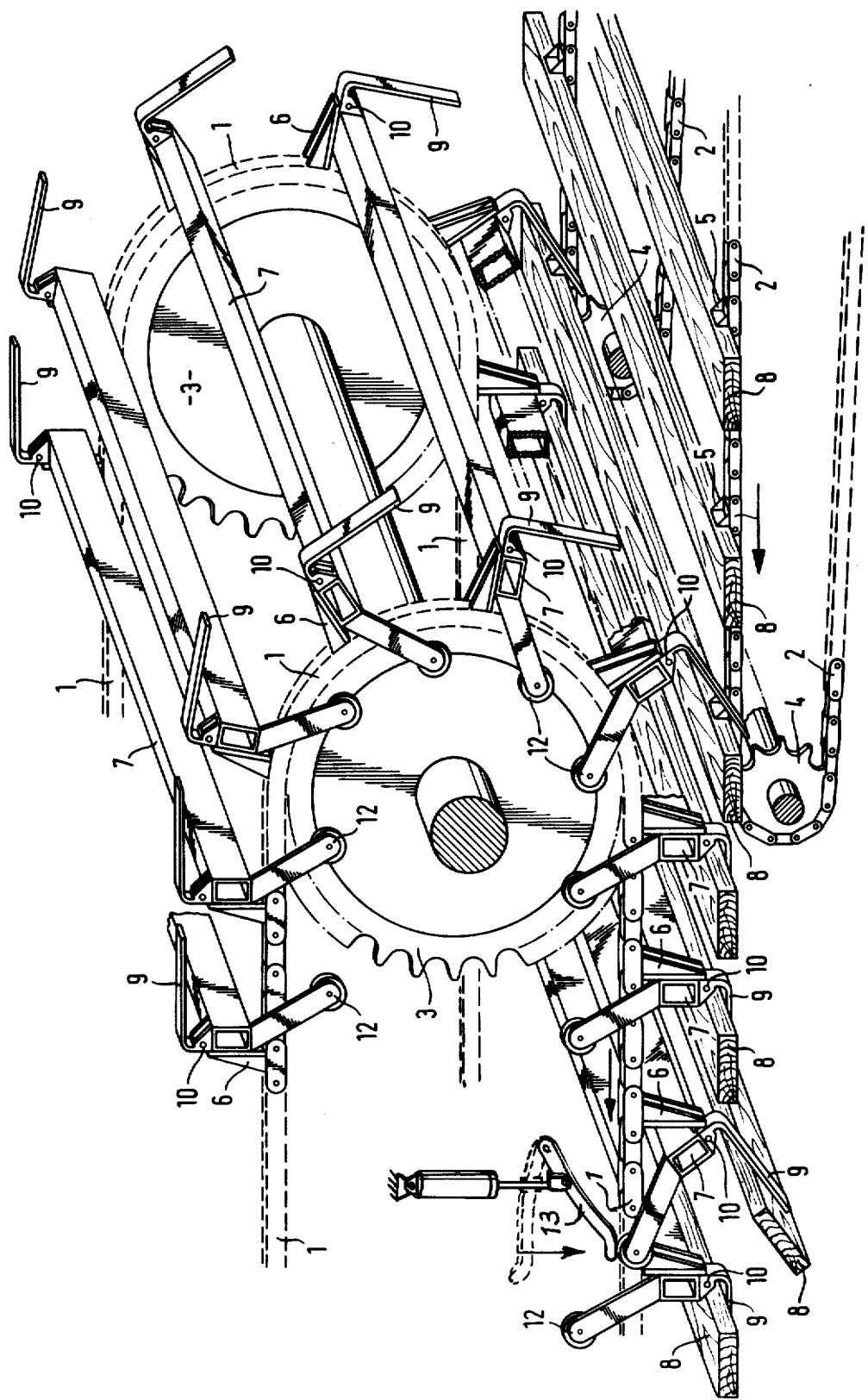

TRANSFERRING AND ASSORTING APPARATUS FOR SAWN TIMBER

BACKGROUND OF THE INVENTION

The present invention relates to a transferring and assorting apparatus for sawn timber, having been arranged to grip one piece of timber at a time from a feed conveyor and to transfer and deliver it to a predetermined point and having, at even intervals in the longitudinal direction of an endless conveyor, at least two L-shaped support hooks fitted spaced apart from each other in the transverse direction; each hook comprises an arm which protrudes from the endless conveyor and at the outer end of which there is a support extending in the travel direction of the conveyor and adapted to be pushed under a piece of timber on the feed conveyor to support and transfer it to the delivery point, where the support hooks have been fitted to pivot about a transverse axle to drop the piece of timber.

In such prior known transferring and assorting apparatus it has been necessary to fit the support hooks at relatively long distances from each other in the longitudinal direction of the conveyor so as to allow the support hooks to turn without hindrance about their pivot points, which is L-shaped in the arm part of the hook. When the hook turns, its elbow is at the same time pushed backwards, and therefore the next support hook must be fitted at a corresponding distance.

It has also been suggested that the support hooks be fitted at an inclined position so that they could be placed closer to each other. In such a case, however, the support hooks must be provided with separate retaining members which prevent the pieces of timber from sliding off the hooks before the assorting point. Such an apparatus is relatively expensive and of complicated structure.

The object of the present invention is therefore to provide an inexpensive and uncomplicated but at the same time high-capacity transferring and assorting apparatus for sawn timber.

SUMMARY OF THE INVENTION

According to the invention there is now provided a transferring and assorting apparatus in which the pivot axle of the support hook is situated such that the distance between the support hooks does not substantially decrease when the support hook is turned for tipping the piece of timber.

A preferred embodiment of the invention comprises an L-shaped support hook adapted to pivot about its elbows, i.e., the intersection of the arm and the support, in which case no part of the support hook is pushed behind the pivot point, and thus in principle the assorting hooks can be fitted at intervals determined by the timber width.

DESCRIPTION OF THE DRAWING

The invention is described with reference to the accompanying drawing, which depicts a schematic side elevation of an embodiment of the invention, mainly of one of its ends.

DESCRIPTION OF THE PREFERRED EMBODIMENTS

In the drawing the two parallel endless chains of the assorting conveyor are indicated by 1, and the endless chains running around a sprocket 4 below the sprocket 3 of the chains 1 are indicated by 2. The chains 2 and the grippers 5 protruding from them constitute the feed conveyor, on top of which the pieces of timber 8 travel sideways at intervals from each other in the longitudinal direction of the chain, so that the assorting conveyor can grip one piece of timber at a time from the feed conveyor and transfer it to the assorting point.

The chains 1 of the assorting conveyor have been fitted, at even intervals in their longitudinal direction, with protrusions 6, each of them having at its free end a pivoted support hook 11 pivoted at 10, the support hook 11 consisting of an arm 7 pointing away from the assorting conveyor and a support 9 attached to the outer end of the arm 7 and protuding in the travel direction of the assorting conveyor.

The assorting conveyor has been synchronized with the feed conveyor in such a way that a transverse row of support hooks is always pushed between two successive pieces of timber 8 on the feed conveyor and under the foremost of the two to support and transfer it to the assorting point, where there are members schematically indicated as 13 in the drawing for forcing the inner end of the assorting hook downwards so that the hook turns and tips the piece of timber 8 at the assorting point.

It is self-evident that the pivot point 10 of the assorting hooks 11 can also be at some other point than at its elbow, e.g. at the level of the upper surface of the supported piece of timber or below it; however, it must be so that the distance between the assorting hooks in the longitudinal direction is not substantially reduced when the support hook is turned. It is also evident that the support of the support hook can be directed backwards with respect to its travel direction.

What is claimed is:

1. A transferring and assorting apparatus for sawn timber of the type adapted to remove one piece of timber at a time from a feed conveyor by supporting the piece from below and to transfer and deliver the piece to a predetermined point, comprising:

an endless coveyor movable in a given plane having a longitudinal transfer portion movable in a transfer direction in said given plane;

at even intervals in the longitudinal direction of the endless conveyor, a protrusion fixedly connected to and extending from said conveyor and at least two substantially L-shaped support hooks spaced apart from each other in a direction transverse to said given plane, each hook including an arm which extends from the endless conveyor and having at its outer end a support which in the transferring position of the hook protrudes in the direction of travel of the transfer portion of said endless conveyor and adapted to be pushed under the piece of timber on said feed conveyor to support the piece from below and transfer the piece to the predetermined delivery point;

each hook being pivoted by an axle for swinging movement about an axis which is transverse to said given plane of movement of the endless conveyor in order to drop the piece of timber;

the pivot axle of the support hook being situated at the intersection of the arm and the support, said axle being directly mounted to the outer end of said protrusion such that the distance between the longitudinally spaced apart support hooks does not substantially decrease when a support hook is pivoted for tipping the piece of timber.

2. The transferring and assorting apparatus of claim 1 in which the transverse pivot axle of the L-shaped hook is below or at the level of the upper surface of the supported piece of timber.

3. The transfer and assorting apparatus of claim 1 wherein said given plane of movement of said endless conveyor is generally vertical, wherein said transfer direction is generally horizontal and wherein said pivot axes of said hooks are horizontal.

* * * * *